(12) United States Patent
Huang et al.

(10) Patent No.: US 10,824,661 B1
(45) Date of Patent: Nov. 3, 2020

(54) MAPPING OF TOPICS WITHIN A DOMAIN BASED ON TERMS ASSOCIATED WITH THE TOPICS

(71) Applicants: Bei Huang, Mountain View, CA (US); Nhung Ho, Redwood City, CA (US)

(72) Inventors: Bei Huang, Mountain View, CA (US); Nhung Ho, Redwood City, CA (US)

(73) Assignee: Intuit Inc., Mountain View, CA (US)

(*) Notice: Subject to any disclaimer, the term of this patent is extended or adjusted under 35 U.S.C. 154(b) by 246 days.

(21) Appl. No.: 15/967,593

(22) Filed: Apr. 30, 2018

(51) Int. Cl.
  *G06F 16/35* (2019.01)
  *G06F 16/338* (2019.01)
  *G06F 16/33* (2019.01)
  *G06F 16/34* (2019.01)

(52) U.S. Cl.
  CPC ............ *G06F 16/35* (2019.01); *G06F 16/338* (2019.01); *G06F 16/3331* (2019.01); *G06F 16/34* (2019.01)

(58) Field of Classification Search
  CPC .... G06F 16/35; G06F 16/3331; G06F 16/338; G06F 16/34; G06F 16/355; G06F 16/358; G06F 16/285; G06F 40/284; G06F 40/10; G06F 40/205; G06F 16/3335; G06F 16/3344; G06F 40/126; G06F 40/253; G06F 40/242; G06F 40/35; G06F 16/36; G06N 20/00; G06N 5/022; G06K 9/00442
  USPC .................................. 707/737, 740; 706/12
  See application file for complete search history.

(56) References Cited

U.S. PATENT DOCUMENTS

| | | | | |
|---|---|---|---|---|
| 6,523,026 | B1* | 2/2003 | Gillis | G06F 16/3332 |
| 9,483,532 | B1* | 11/2016 | Zhang | G06F 16/3334 |
| 9,672,497 | B1* | 6/2017 | Lewis | G06F 40/40 |
| 9,715,495 | B1* | 7/2017 | Tacchi | G06F 16/358 |
| 2009/0292697 | A1* | 11/2009 | Oda | G06F 16/353 |
| 2011/0153595 | A1* | 6/2011 | Bernstein | G06F 16/951 707/722 |
| 2012/0278332 | A1* | 11/2012 | Wang | G06F 40/284 707/740 |
| 2013/0097103 | A1* | 4/2013 | Chari | G06N 20/00 706/12 |

(Continued)

OTHER PUBLICATIONS

Yin, J. et al., "A Dirichlet Multinomial Mixture Model-based Approach for Short Text Clustering", Proceedings of the 20th ACM SIGKDD International Conference on Knowledge Discovery and Data Mining, KDD '14, New York, New York, USA, Aug. 24-27, 2014, pp. 233-242 (10 pages).

*Primary Examiner* — Dennis Truong
(74) *Attorney, Agent, or Firm* — Ferguson Braswell Fraser Kubasta PC

(57) ABSTRACT

The invention relates to a method for mapping topics. The method includes obtaining terms, obtaining tokens from each term, and identifying a first and a second set of topics. Each of the topics represents one or more of the terms. The method further includes identifying first and second topic names for the first and the second sets of topics. For each topic, the tokens associated with the terms assigned to the topic are analyzed for relevance, and a token with a high relevance is selected as the topic name. The method also includes selecting one of the first and one of the second sets of topics to obtain first and second selected topics, determining, based on the one or more terms, a similarity value between each of the first and the second selected topics, and establishing a mapping between similar first and second selected topics.

20 Claims, 9 Drawing Sheets

(56) References Cited

U.S. PATENT DOCUMENTS

| | | | |
|---|---|---|---|
| 2013/0212110 A1* | 8/2013 | Stankiewicz | G06Q 30/0631 |
| | | | 707/740 |
| 2014/0122456 A1* | 5/2014 | Dies | G06F 16/24578 |
| | | | 707/706 |
| 2014/0207777 A1* | 7/2014 | Palmert | G06F 16/90335 |
| | | | 707/737 |
| 2015/0066968 A1* | 3/2015 | Bastide | G06F 16/3344 |
| | | | 707/758 |
| 2016/0188576 A1* | 6/2016 | Huang | G06F 40/51 |
| | | | 704/2 |
| 2016/0224900 A1* | 8/2016 | Steele, Jr. | G06F 40/284 |
| 2016/0283906 A1* | 9/2016 | Cranfill | G06F 16/334 |
| 2017/0075991 A1* | 3/2017 | Kataria | G06F 16/358 |
| 2017/0160876 A1* | 6/2017 | Brew | G06F 16/3349 |
| 2018/0121431 A1* | 5/2018 | Shan | G06N 5/04 |
| 2018/0330729 A1* | 11/2018 | Golipour | G10L 15/16 |
| 2019/0155924 A1* | 5/2019 | Guggilla | G06F 16/84 |

* cited by examiner

MAPPING OF TOPICS WITHIN A DOMAIN BASED ON TERMS ASSOCIATED WITH THE TOPICS

BACKGROUND

An abundance of different terms may be used in particular domains (or broad subject areas), such as in science, engineering, finance, accounting, etc. The particular domain may also be referred to as a compliance domain. Within these domains, some of these terms may be more interrelated than other terms. For example, in engineering, certain terms may be associated with the topic of "electrical engineering", whereas other terms may be associated with the topic of "mechanical engineering". Similarly, in accounting, certain terms may be associated with "accounts receivable", whereas other terms may be associated with "accounts payable". These terms may be stored in repositories and may be accessed by humans and/or algorithms. Processing vast numbers of these terms may be inefficient or even error-prone, in particular when terms are redundant, ambiguous or otherwise poorly chosen. Accordingly, it may be beneficial to organize the terms that are used in a particular domain.

SUMMARY

In general, in one aspect, one or more embodiments relate to a method for mapping topics within a domain based on terms associated with the topics. The method includes obtaining a plurality of terms that are specific to a domain, obtaining tokens from each term, identifying, using a short-text clustering algorithm operating on the tokens, a first plurality and a second plurality of topics, wherein each of the topics represents at least one of the terms, and wherein each of the term is assigned to exactly one topic. The method further includes identifying a first plurality and a second plurality of topic names for the first plurality and the second plurality of topics, wherein for each topic, the tokens associated with the terms assigned to the topic are statistically analyzed for relevance, and wherein a token with a high relevance is selected as the topic name. In addition, the method includes selecting one of the first plurality of topics and one of the second plurality of topics to obtain first selected topics and second selected topics, determining, based on the at least one of the terms, a similarity value between each of the first selected topics and the second selected topics, and establishing, based on the similarity value, a mapping between similar first selected topics and the second selected topics within in the domain.

In general, in one aspect, one or more embodiments relate to a system for mapping topics within a domain based on terms associated with these topics. The system includes a hardware processor and memory, and software instructions stored in the memory, which when executed by the hardware processor, cause the hardware processor to obtain a plurality of terms that are specific to a compliance domain, obtain tokens from each term, and identify, using a short-text clustering algorithm operating on the tokens, a first plurality and a second plurality of topics, wherein each of the topics represents at least one of the terms, and wherein each of the term is assigned to exactly one topic. The software instructions further cause the hardware processor to identify a first plurality and a second plurality of topic names for the first plurality and the second plurality of topics, wherein for each topic, the tokens associated with the terms assigned to the topic are statistically analyzed for relevance, and wherein a token with a high relevance is selected as the topic name, select one of the first plurality of topics and one of the second plurality of topics to obtain a first selected topics and a second selected topics, determine, based on the at least one of the terms, a similarity value between each of the first selected topics and the second selected topics; and establish, based on the similarity value, a mapping between similar first selected topics and the second selected topics within in the compliance domain.

In general, in one aspect, one or more embodiments relate to a non-transitory computer readable medium including computer readable program code for causing a computer system to obtain a plurality of terms that are specific to a compliance domain, obtain tokens from each term, and identify, using a short-text clustering algorithm operating on the tokens, a first plurality and a second plurality of topics, wherein each of the topics represents at least one of the terms, and wherein each of the term is assigned to exactly one topic. The program code further causes the computer system to identify a first plurality and a second plurality of topic names for the first plurality and the second plurality of topics, wherein for each topic, the tokens associated with the terms assigned to the topic are statistically analyzed for relevance, and wherein a token with a high relevance is selected as the topic name, select one of the first plurality of topics and one of the second plurality of topics to obtain a first selected topics and a second selected topics, determine, based on the at least one of the terms, a similarity value between each of the first selected topics and the second selected topics, and establish, based on the similarity value, a mapping between similar first selected topics and the second selected topics within in the compliance domain.

Other aspects of the disclosure will be apparent from the following description and the appended claims.

DETAILED DESCRIPTION

Figure 1A:
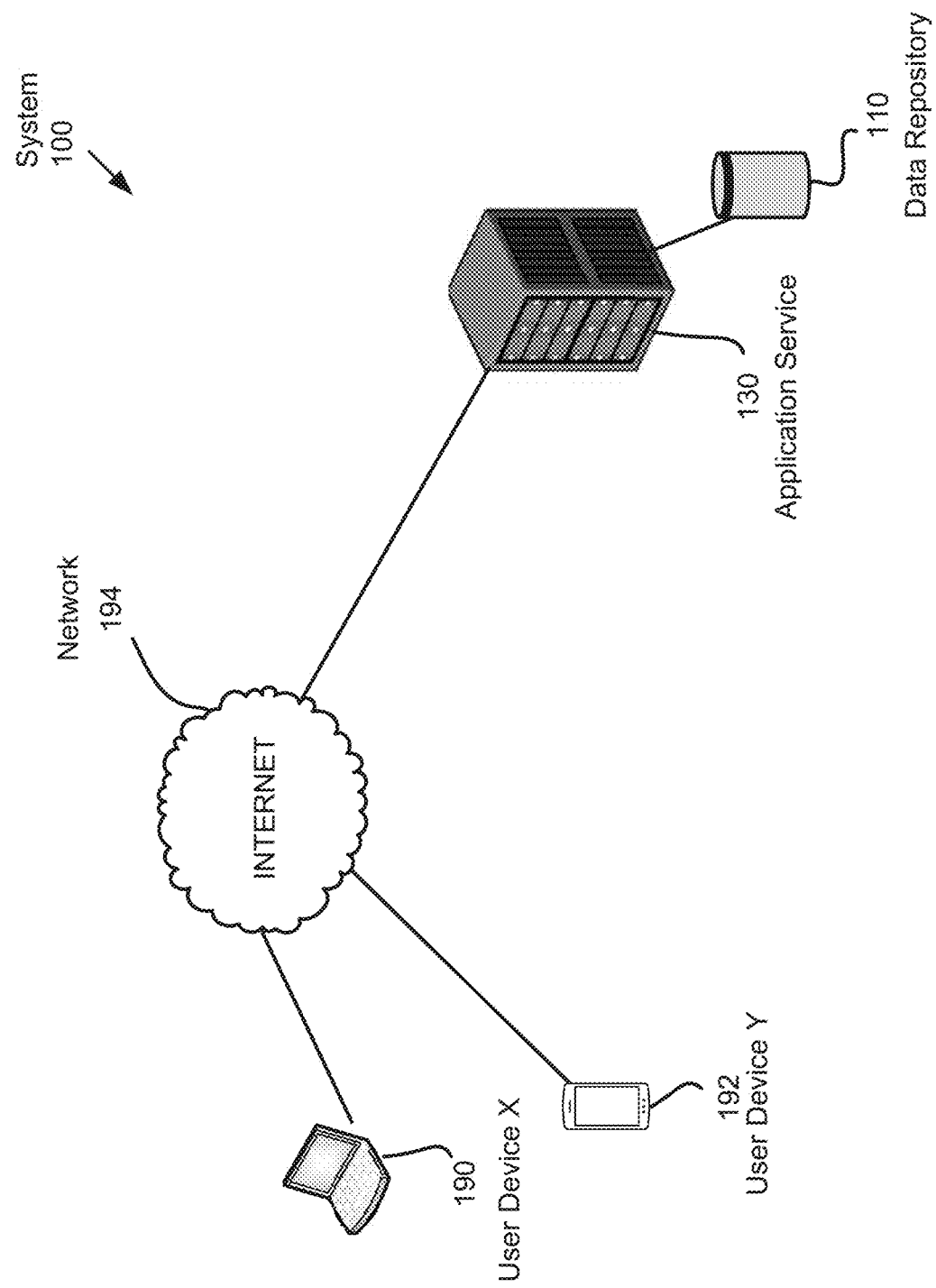
FIGS. 1A and 1B show systems for domain-specific topic and sub-topic identification, in accordance with one or more embodiments of the disclosure.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the disclosure, the various disclosed embodiments may be combined in virtually any manner. All combinations are contemplated herein.

In general, embodiments of the present disclosure relate to the mapping of topics within a domain (also known as a compliance domain), based on terms associated with the topics. Terms used in certain domains may be grouped in a meaningful manner to provide structure to these terms. The grouping may be performed by establishing topics and sub-topics to which these terms may be assigned. Consider, for example, the engineering terms "fuse", "hinge", "bearing", "resistor", and "capacitor". One may establish a first topic "mechanical engineering" to which the terms "hinge" and "bearing" are assigned, and a second topic "electrical engineering", to which the terms "fuse", "resistor" and "capacitor" are assigned". Embodiments of the disclosure enable the identification of suitable topics and the naming these topics. Embodiments of the disclosure are applicable to any domain where it is desirable or necessary to provide structure to terms used within that domain, for example, in engineering, science, networking, finance, accounting, etc.

In one or more embodiments of the disclosure, different users may use different terms when dealing with the same subject matter. Consider, for example, a small business scenario. The small business relies on a chart of accounts that includes many accounts that are used to conduct business. These accounts are generally named by the small business owner based on the use of these accounts. For example, one account is named "Jeff's delivery van", and another account may be named "Pizza oven maintenance". The small business owner uses these accounts to gain business insights, in this particular case by tracking expenses associated with a delivery van and a pizza oven.

The account names may be grouped under topics to provide structure. For example, the two exemplary accounts may be grouped under a topic that covers business expenses. Now, assume that the small business relies on an accountant to meet tax obligations. Accountants are more likely to use standardized terms for accounts, in comparison to small business owners that are not necessarily familiar with the domain of accounting. For example, an accountant would use an account name such as "delivery vehicle expenses" rather than "Jeff's delivery van". Accordingly, while both the small business owner and the accountant operate on the same underlying subject matter (the financials of the small business), the terms that they use to describe the subject matter (here, account names) are different. Both the accountant and the small business owner, therefore, obtain different topics when grouping the account names that they established. However, to seamlessly perform the various financial tasks associated with the small business (e.g., generating business insights and filing tax documents), it may be beneficial to have a mapping between the topics generated by the small business owner for the purpose of gaining business insights and the topics generated by accountants for the purpose of preparing tax form.

Another example may be obtained from the healthcare domain. Medical professionals tend to use medical terms that are mostly Greek and Latin terms. In contrast, non-professionals, e.g., patients, tend to use English language terms. For example, a patient may report chest pain, whereas a clinician would document thoracic pain as the patient complaint.

Similar scenarios exist in other domains anywhere where non-professional users use non-professional terms, and where professional users use professional terms. More generally speaking, such scenarios exist in any scenario where a first group or person uses terms that are different from the terms that are used by a second group or person when discussing the same or similar underlying subject matter. In any such situation it may be desirable to establish a mapping between topics that cover similar subject matter, although using different terms. Establishing a mapping between a first set of terms organized in a first topic, and a second set of terms organized in a second topic, in accordance with one or more embodiments of the disclosure, may therefore be beneficial.

Turning to FIG. 1A, a system for mapping of topics within a domain, based on terms associated with the topics, in accordance with one or more embodiments of the present disclosure, is shown. The system (100) may include a data repository (110), an application service (130), user devices (190, 192) and a network (194). Each of these components is described below.

The application service (130), in accordance with one or more embodiments of the present disclosure, includes a set of machine-readable instructions (stored on a computer-readable medium) which, when executed by the application service (130) identify topics from a collection of terms in a domain and/or name these topics. The machine-readable instructions further map topics within the domain, based on the terms associated with these topics. The application service (130) may be hosted on any type of physical or virtual computing device, locally and/or cloud-based. An exemplary computing device is described below with reference to FIGS. 8A and 8B. A detailed description of the operations that may performed by the application service (130) is provided in the flowcharts of FIGS. 2, 3, 4, and 5. A description of the architecture of the application service (130) is provided in FIG. 1B.

The data repository (110), in accordance with one or more embodiments of the present disclosure, stores terms, topics, sub-topics, and/or names for topics and sub-topics as subsequently discussed with reference to FIG. 1B. The database used for the data repository (110) may be implemented using any format suitable for the storage of terms, topics, sub-topics, and/or names for topics and sub-topics. The data repository (110) may be stored in non-volatile or volatile memory, e.g. on a hard disk drive or in Random Access Memory (RAM). The data repository (110) may directly interface with the application service (130), e.g., the application service (130) and the data repository (110) it may be hosted on the same computing system, or they may be connected via the subsequently described network (194). The data repository (110) may be a single database, or it may be organized in a distributed manner. In one or more embodiments of the disclosure, thousands or millions of users contribute to the content of the data repository. Additional details regarding the data repository are provided below, with reference to FIG. 1B.

The user devices (190, 192), in accordance with one or more embodiments of the present disclosure, enable users to access the system (100). A user may access the system to perform tasks that involve the use of terms in a particular domain, using a user device (190, 192). For example, in the domain of accounting, the user may be an accountant responsible for registering transactions for the purpose of ensuring tax compliance and/or obtaining business insights. A user device (190, 192) may be any type of a computing device, e.g., a non-portable or portable device. An exemplary computing device is described below with reference to FIGS. 8A and 8B. The system (100) may be accessed by a browser-based application a web-page or a stand-alone application executing on a user device (190, 192).

The components of the system (100), i.e., the data repository (110), the application service (130) and the user devices (190, 192) may communicate using any combination of wired and/or wireless communication protocols via a network (194). In one embodiment of the present disclosure, some or all of these components communicate via a wide area network (e.g., over the Internet), and/or a local area network (e.g., an enterprise or home network). The communication between these components may include any combination of secured (e.g., encrypted) and non-secured (e.g., un-encrypted) communication. The manner in which these components communicate may vary based on the implementation of the present disclosure.

Figure 1B:
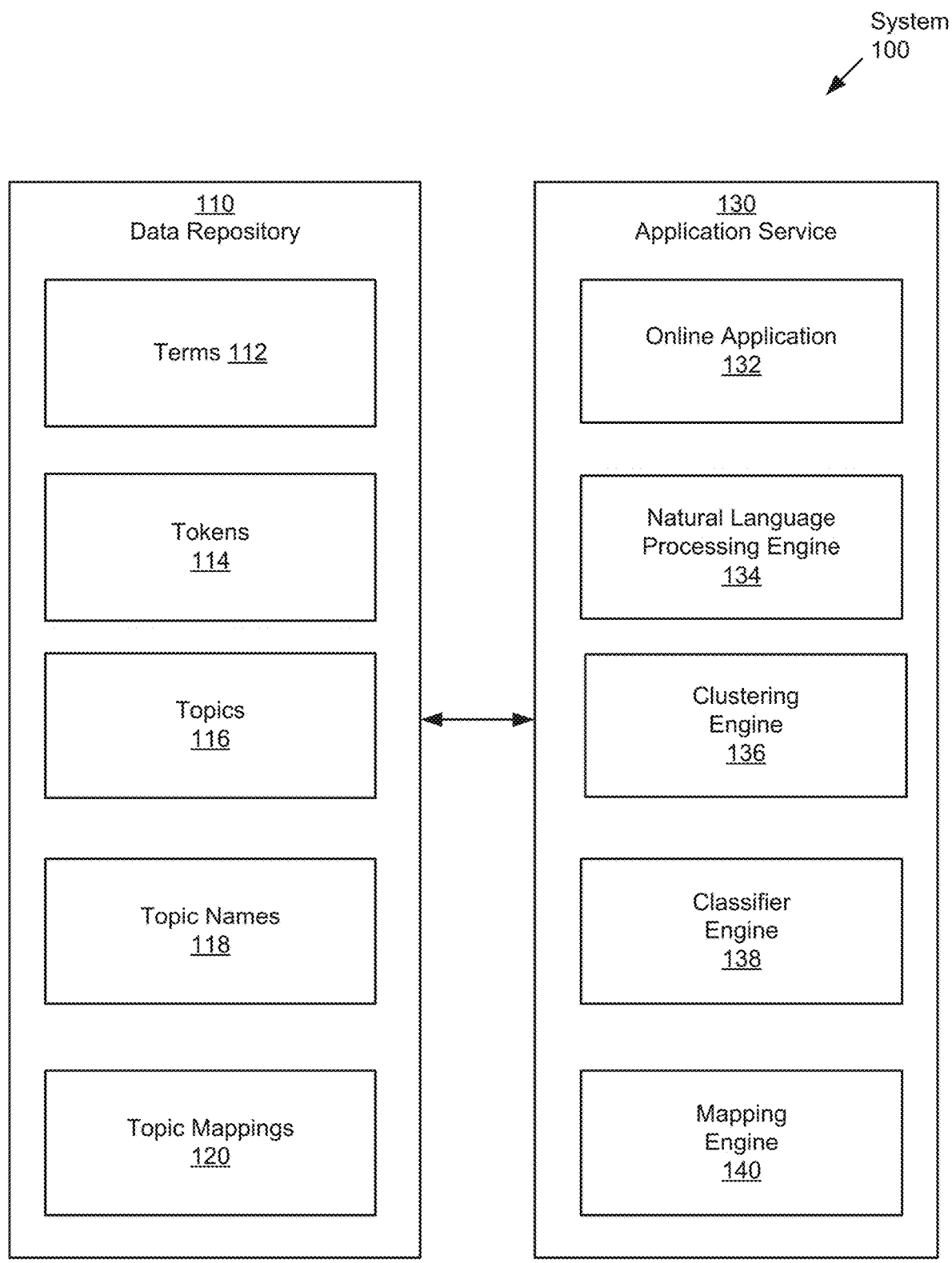

Turning to FIG. 1B, the data repository (110) and the application service (130) are shown. The data repository (110) may store terms (112), tokens (114), topics (116), topic names (118), and topic mappings (120). Each of these components is subsequently described.

The terms (112), in accordance with one or more embodiments of the disclosure, form the data to be used for the domain-specific topic and sub-topic identification and for the mapping of topics within a domain. A term may be any kind of language element such as, for example, a word, a phrase, a sentence, an abbreviation, an acronym, etc. The terms (112), in accordance with an embodiment of the disclosure, are rooted in a particular domain. For example, the terms may relate to the domain of finance, the domain of accounting, the domain of engineering, the domain of science, etc. Those skilled in the art will appreciate that the terms can be rooted in any domain. More specifically, in an accounting scenario, the terms may be account names; in an engineering application, the terms could be components (e.g., devices, circuits, hardware, etc. typically used in engineering applications); in a warehousing application, the terms could describe the inventory; in a healthcare application the terms could be diagnoses; in a pharmaceutical application, the terms could be drugs; in a dietary application, the terms could be ingredients; in a petrochemical refining application, the terms could be organic compounds, etc.

Depending on the domain and/or depending on the use of the terms (112) by the online application (132), the format used for storing the terms (112) in the data repository (110) may differ. Consider, for example, an accounting application used to document business transactions. Here, the terms may be account names, which may be stored as a chart of accounts, i.e., a collections of accounts for, e.g., assets, liabilities, etc. In contrast, in a warehousing application, the terms may describe the inventory as part of an enterprise resource planning (ERP) system. Those skilled in the art will recognize that the terms may be stored in any format, as necessary or desirable for a particular application.

In one or more embodiments of the disclosure, the terms may be provided by thousands or millions of users. Accordingly, a massive number of terms may be stored in the data repository (110). For example, in an accounting application, many users may rely on an accounting service provided by the online application (132). While each user may operate on his or her own chart of accounts, all account names under these different charts of accounts may be considered terms (112). Some of these terms may overlap (for example, when users are using similar but not identical account names), some of the terms may be identical (when at least two users use the exact same account names), and some of the terms may be unique. Further, the users that contribute terms may be a mix of professional and non-professional users. Accordingly, the terms that these users contribute may differ, even when directed to the same underlying content. For example, a non-professional user may rely on an account "Fred's car" to track vehicle expenses, whereas a professional user, for the same task of tracking vehicle expenses may use an account "tech-support, 2017—vehicle expenses". The significance of professional and non-professional users is discussed below with reference to the flow charts of FIGS. 2, 3, 4 and 5.

The tokens (114), in accordance with one or more embodiments of the disclosure, are based on the terms (112). A token, in accordance with one or more embodiments of the disclosure, is a sequence of characters that form a semantic unit. A token may be a unigram, a bigram, a trigram, or generally an n-gram derived from a term. A description of how the tokens are obtained by the natural language processing engine (134) is provided below with reference to FIG. 2.

The topics (116), in accordance with one or more embodiments of the disclosure, are formed by terms (112) that are grouped by the clustering engine (136). The grouping may be performed such that terms that are related to a particular topic are grouped under that topic, whereas other terms are grouped under different topics. This may be accomplished using the tokens (114), as further described below with reference to FIGS. 2 and 3. The topics (116) may include subtopics, i.e., terms that are grouped under a topic may further be organized in sub-topics, under the topic. Consider, for example, an accounting application in which a topic that covers various types of expenses is used. Subtopics may include, for example, "vehicle expenses", "office expenses", etc. to provide a better granularity. In one or more embodiments of the disclosure, multiple topics that are directed to the same underlying subject matter exist. These multiple topics, although directed to the same underlying subject matter, are based on different terms used for similar or the same subject matter. A detailed description of the methods used for obtaining topics and sub-topics is provided below with reference to the flowcharts.

The topic names (118), in accordance with one or more embodiments of the disclosure, are used as descriptors of the topics (116) and may be assigned by the classifier engine (138). A name may be assigned to the topic to facilitate identification of the topic. Consider the previously introduced accounting example. The topic that is used for tracking various types of expenses may me named "expenses. A detailed description of the methods used for obtaining topic names is provided below with reference to the flowcharts of FIGS. 2 and 3.

The topic mappings (120), in accordance with one or more embodiments of the disclosure, are used to indicated relationships between topics. More specifically, different topics may contain terms directed to the same or similar subject matter. The topic mappings (120) are used to establish links between such topics. The topic mappings may be stored in a table, using pointers, or in any other form that enable the linking of topics. A detailed description of the methods used for obtaining topic mappings is provided below with reference to the flowcharts of FIGS. 2 and 5.

While FIG. 1B shows a single data repository, those skilled in the art will appreciate that the terms (112), the text-regularized terms (114), the topics (116), the topic names (118), and the topic mappings (120) may be stored in separate data repositories. These data repositories may be individual or distributed repositories that may be local to the application service (130) or remote.

Continuing with the discussion of FIG. 1B, the application service (130) may include an online application (132), a natural language engine (134), a clustering engine (136), a classifier engine (138), and a mapping engine (140). Each of these components is subsequently described.

Turning to the components of the application service (130), the online application (132) enables a user to perform operations associated with the terms (112), in accordance with one or more embodiments of the disclosure. Depending on the domain, the nature and functionality of the online application (132) may differ. Consider, for example, the domain of accounting. In this scenario, the online application (132) may be accounting software that allows a user to assign or view transactions associated with accounts that are organized based on a chart of accounts. Frequently, this scenario involves compliance requirements, e.g., to satisfy standards established for ensuring tax compliance and/or for obtaining business insights. Accordingly, in this scenario, the online application (132) may include accounting, business, and/or management functionality that may be accessible via a user interface.

Professional and/or non-professional users may access the online application (132). In one or more embodiments of the disclosure, the online application (132) accommodates thousands or even millions of users that access the application via the user interface provide on the users' devices (192). In one or more embodiments of the disclosure, the online application (132) is involved in the generation of and/or retrieval of the terms (112). In one or more embodiments of the disclosure, the online application (132) further uses the topics (116) and topic names (118). For example, the topics and topic names, established as described below, may be provided to a user as suggestions to encourage or facilitate the compliance with applicable standards. For example, in an accounting application, it may be beneficial to get users to rely on commonly accepted account names, rather than arbitrarily chosen account names.

Those skilled in the art will recognize that the disclosed embodiments are not limited to applications in the domains of finance or accounting. As previously noted, embodiments of the disclosure may be used wherever a grouping of terms into topics is beneficial and/or where a mapping between non-specialized language to specialized language is desirable. This may also include, for example, science and engineering disciplines, government service, networking, etc.

Continuing with the discussion of FIG. 1B, the natural language processing engine (134), in accordance with one or more embodiments of the disclosure, is configured to perform a regularization of the terms (112) and/or a tokenization of the terms to obtain tokens (114). The text regularization and/or tokenization may involve methods of natural language processing, and a detailed description of the text regularization and the tokenization is provided below with reference to FIG. 2.

The clustering engine (136), in accordance with one or more embodiments of the disclosure, is configured to obtain a set of clusters, each cluster forming a topic (116). The clusters contain terms (112), which are assigned to the clusters using the tokens (114). The clustering operation may involve methods of text clustering that are further described below with reference to FIGS. 2 and 3.

The classifier engine (138), in accordance with one or more embodiments of the disclosure, is configured to obtain topic names for the topics. A topic name may be obtained from the collection of text-regularized terms using a classifier that is further described with reference to FIG. 2.

The mapping engine (140), in accordance with one or more embodiments of the disclosure, is configured to establish mappings between topics directed to the same or similar underlying subject matter. The operations performed by the mapping engine (140) are described in detail with reference to FIG. 5.

While FIGS. 1A and 1B show configurations of components, other configurations may be used without departing from the scope of the present disclosure. For example, various components may be combined to create a single component. As another example, the functionality performed by a single component may be performed by two or more components that may be communicatively connected using a network connection.

FIGS. 2, 3, 4 and 5 show flowcharts in accordance with one or more embodiments of the present disclosure. While the various steps in these flowcharts are provided and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the present disclosure. By way of an example, determination steps may not require a processor to process an instruction unless an interrupt is received to signify that condition exists in accordance with one or more embodiments of the present disclosure. As another example, determination steps may be performed by performing a test, such as checking a data value to test whether the value is consistent with the tested condition in accordance with one or more embodiments of the present disclosure.

Figure 2:
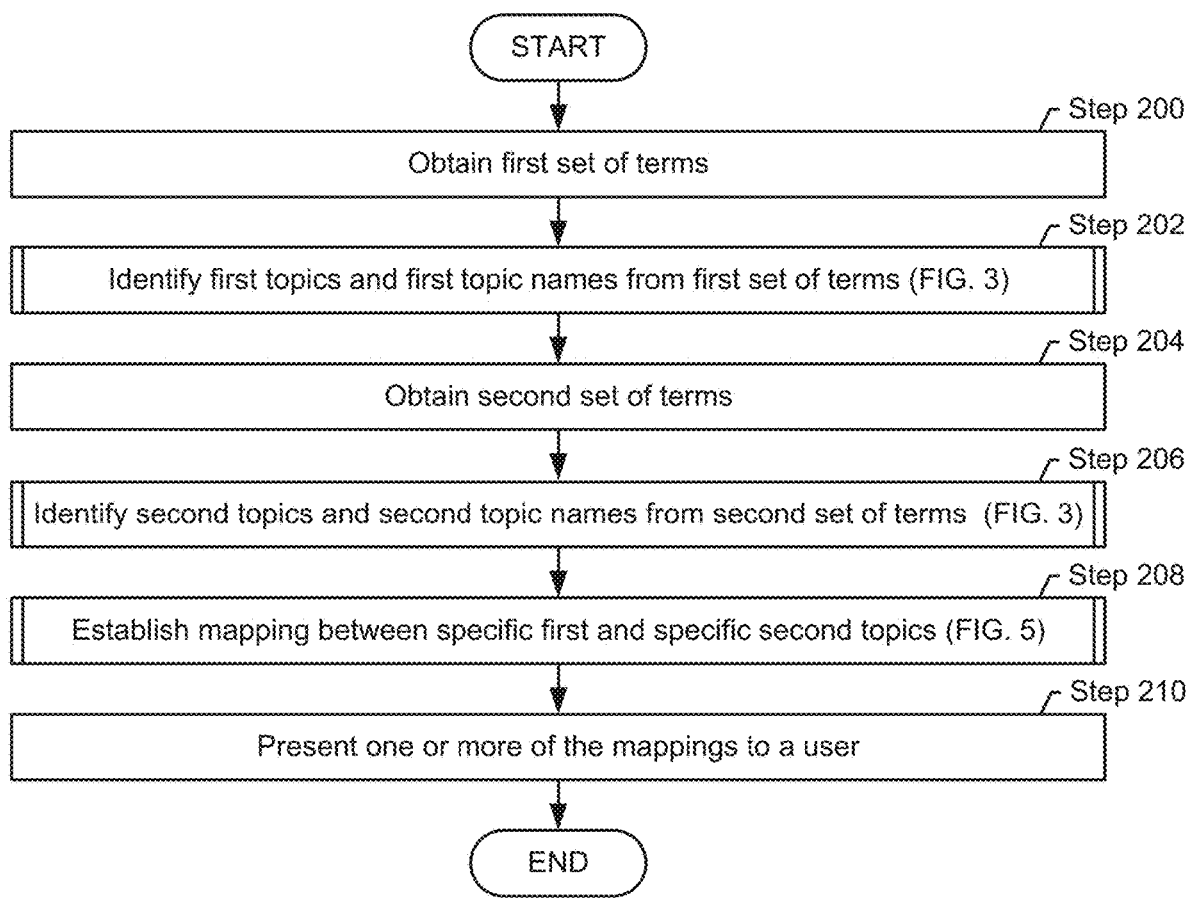
FIGS. 2, 3, 4 and 5 show flowcharts in accordance with one or more embodiments of the disclosure.

Turning to FIG. 2, a method for establishing mappings between related topics is shown. More specifically, FIG. 2 shows how first and second topics and topic names are obtained and how, subsequently, a mapping is established between the first and the second topics, where applicable. The first and the second terms, topics and topic names are directed to the same domain, but they were separately obtained. Accordingly, while the underlying subject matter is similar, the characterization of the underlying subject matter may differ. Consider, for example, a chart of accounts for a small business. The small business owner may pick account names that are suitable for his goal to obtain business insights. In contrast, an accountant may name the accounts differently, based on his goal to prepare tax forms for the small business. Accordingly, even though the underlying subject matter (accounts) is identical, different terms are being used. Similar situations may arise in any other domain, such as in healthcare, engineering, science, or even when a foreign language is used. Mappings may, thus, be established to link related topics.

The subsequently described method establishes a mapping between such first and second topics, based on a detected similarity of these topics, in accordance with one or more embodiments of the disclosure. In one or more embodiments, the method shown in this figure is performed by components of the application service (130) using the data repository (110). Various steps of the method are subsequently described, and an example is provided in FIG. 6.

In Step 200, terms are obtained for further processing. To distinguish these terms from the terms obtained in Step 204, these terms are subsequently identified as "first terms". The first terms may be retrieved from the data repository, and the methods for retrieving the first terms from the data repository may be specific to the data repository. In one or more embodiments of the disclosure, a distinction is made between terms that were provided by professionals, and terms that were provided by non-professionals. In one embodiment of the disclosure, only the terms provided by professionals, but not the terms provided by non-professionals are obtained in Step 200. Consider, for example, an accounting application. In this scenario, account names that were entered by accountants may be retrieved, whereas account names that were entered by users without accountant qualifications may not be retrieved.

In Step 202, first topics are identified for the first terms. The obtaining of the first topics from the first terms is described in detail below, with reference to FIG. 3.

In Step 204, additional terms, different from the terms obtained in Step 200, yet referring to the same underlying subject matter, are obtained for further processing. To distinguish these additionally obtained terms from the terms obtained in Step 202, these terms are subsequently identified as "second terms". The second terms may be retrieved from the data repository, and the methods for retrieving the second terms from the data repository may be specific to the data repository. As previously noted, a distinction may be made between terms that were provided by professionals, and terms that were provided by non-professionals. In one embodiment of the disclosure, only the terms provided by non-professionals, but not the terms provided by professionals are obtained in Step 204. Consider, for example, an accounting application. In this scenario, account names that were entered by non-accountants may be retrieved, whereas account names that were entered by users with accountant qualifications may not be retrieved.

In Step 206, second topics are identified for the second terms. The obtaining of the second topics from the second terms is described in detail below, with reference to FIG. 3.

Figure 5:
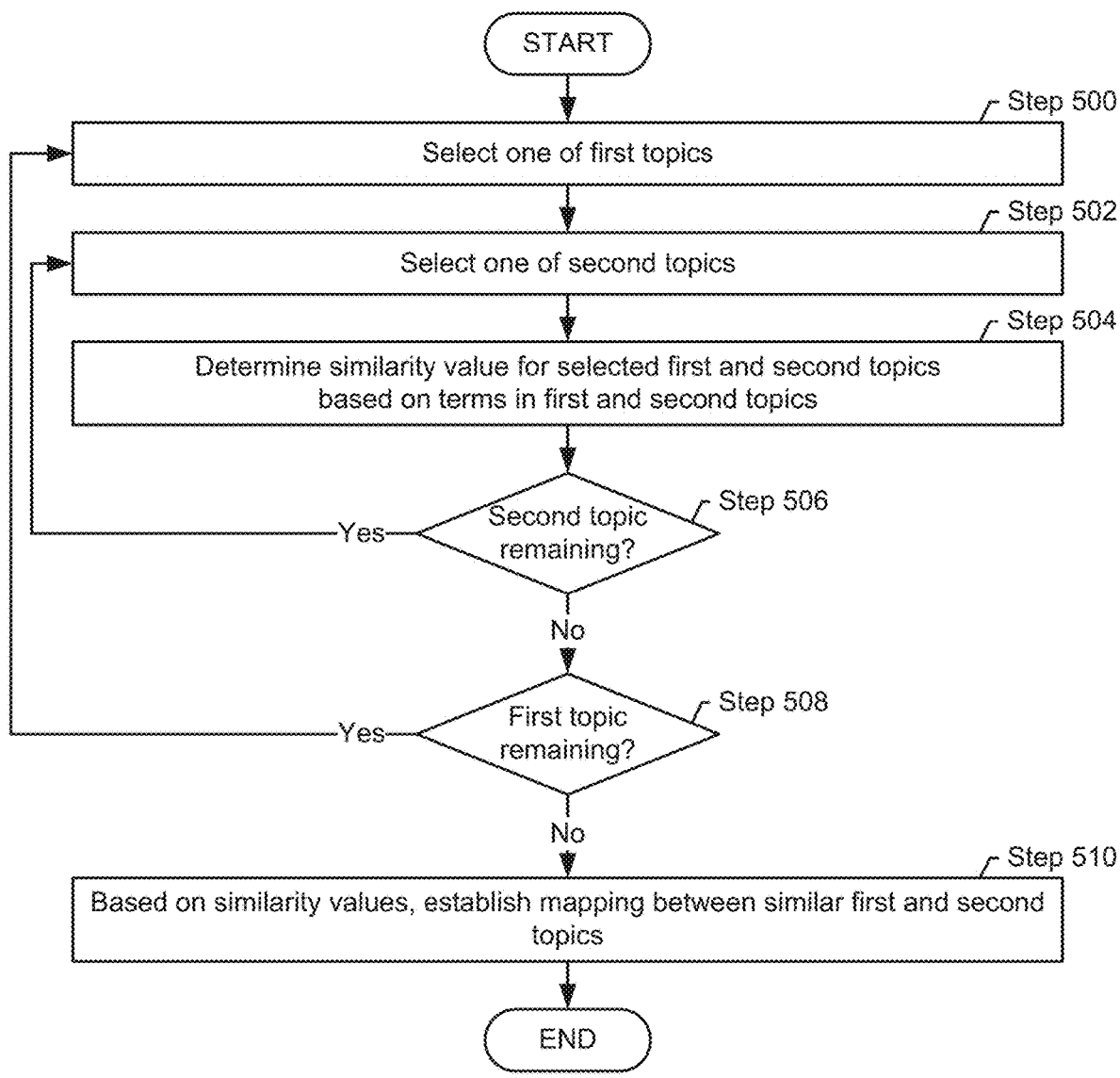

In Step 208, a mapping is established between one or more of the first topics and one or more of the second topics as described in FIG. 5. The mapping may include mappings between multiple topics, including one-to-one and one-to-multiple/many mappings. A mapping between topics, in accordance with one or more embodiments of the disclosure, indicates similarity of the mapped topics. In other words, when a mapping is established between one of the first topics and one of the second topics, the mapping may indicate that these topics refer to the same or similar underlying subject matter. A similarity value may further be provided for a mapping between topics to indicate the degree of similarity between the mapped topics. The methods for used for mapping topics, additional details and examples are subsequently provided.

In Step 210, one or more of the obtained mappings are presented to a user. A mapping may be presented using a graphical user interface (GUI) of the online application. The presentation of a mapping may occur, for example, when a user is performing a task in the online application. The presented mapping may serve as a suggestion to facilitate the user's task. Additional details regarding providing mappings to users are discussed below with reference to FIG. 7.

Figure 3:
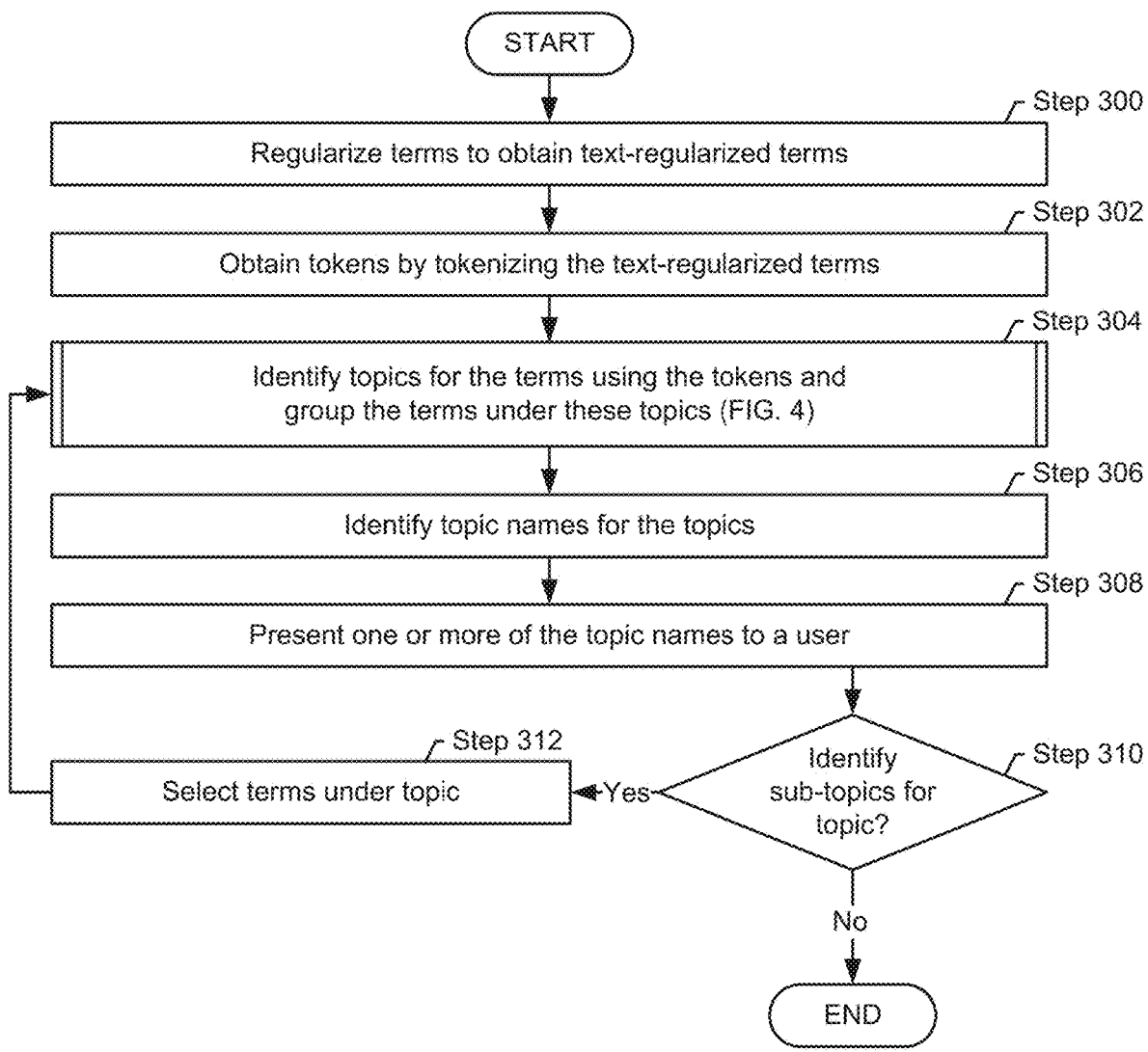

Turning to FIG. 3, a method for identifying topics and topic names is described. The method may be used to perform Step 202. In Step 202, the method identifies first topics and first topic names from the first terms. The method may also be used to perform Step 206. In Step 206, the method identifies second topics and second topic names from the second terms.

In Step 300, a text regularization is performed on the terms to obtain text-regularized terms. The text regularization may include various methods of natural language processing such as, for example: (i) removal of special characters (e.g., dashes); (ii) removal of stop words (e.g., articles like "the", as well as stop words in a custom domain-specific dictionary, e.g., a word such as "expense" that tends to be used ubiquitously in a domain such as accounting); (iii) stemming (e.g., changing "cleaning" to "clean" by performing the process of reducing inflected (or derived) words to its word stem, base, or root form); (iv) lowering the case of characters; (v) removal of short tokens (e.g., "of"); and/or (vi) auto-correction of typographical errors.

In Step 302, a tokenization of the text-regularized terms is performed. The resulting tokens may include sequences of characters that form semantic units. For example, a token may include one or more words. A token may be a unigram, a bigram, a trigram or, more generally, an n-gram, obtained from a text-regularized term. In one embodiment of the disclosure, a token is a bigram (i.e., a sequence of two adjacent elements from a string of tokens, which are typically letters, syllables, or words).

In Step 304, topics are identified for the terms, using the tokens. In one or more embodiments of the disclosure, a clustering operation is performed to identify topics. More specifically, the tokens are clustered, to obtain clusters of tokens. Each cluster may represent a topic. Subsequently, the terms are assigned to the topics based on the origin of the clustered tokens. For example, if a particular token is assigned to a first cluster, the topic from which the token originates is assigned to the topic associated with that first cluster.

Various clustering algorithms may be used without departing from the disclosure. In one or more embodiments of the disclosure, a short-text clustering algorithm is used to perform the clustering of the text-regularized terms into a specified number, k, of clusters that form the topics. The short-text clustering algorithm may be based on a Dirichlet multinomial mixture model that may operate as subsequently described below in relation to FIG. 4.

In Step 306, topic names are obtained for the topics identified in Step 206. The topic names may be obtained through a statistical analysis of relevance of the tokens (e.g. n-grams) associated with the terms under a topic. A ranked list of the tokens may be obtained, based on the relevance. The highly ranked token may then be chosen as the topic name. Various statistical methods may be used to determine relevance (i.e., how high or low the token is ranked):

(i) The term frequency may be used, i.e., the more frequently a particular token appears the higher its relevance.

(ii) The term frequency-inverse document frequency (TD-IDF) may be used, i.e., the frequency of a token among all tokens under the topic may be weighted by the general frequency of the token (e.g., based on the occurrence of the token in a domain-specific text, or elsewhere). The higher the TD-IDF of a particular token, the higher its relevance may be.

(iii) The mutual information may be obtained to assess the degree of information that a selected token provides about the body of all tokens under the topic. A higher mutual information, in this information-theoretical approach, may indicate that the analyzed n-gram is more representative for the body of tokens than a lower mutual information.

(iv) Other statistics may be relied upon, without departing from the present disclosure. Such statistics may be based on or build on regularized term frequency, cosine similarity using word2vec or sent2vec algorithms, bag of words models, skip-gram models, etc.

In Step 308, one or more of the topic names are presented to a user. A topic name may be presented using a graphical user interface (GUI) of the online application. The presentation of a topic name may occur, for example, when a user is performing a task in the online application. The presented topic name may serve as a suggestion to facilitate the user's task. Consider, for example, an accounting application. Further assume that the previously discussed steps were performed on accounting data (terms) that were obtained from accounting professionals. Accordingly, these terms may be assumed to be quality terms that resulted in the generation of quality topics and topic names. As a non-professional user is accessing the accounting application, the suggestions of quality topics and topic names is particularly beneficial as it may improve the user's choice of account names if the user relies on the guidance provided by the suggestions. An exemplary user interface where this is further illustrated is shown in FIG. 5.

In Step 310, a determination is made about whether subtopics are to be identified. The determination may be made base on the initially obtained terms and based on how these terms were originally structured. If the terms were, to at least some extent, hierarchically structured, it may be decided that subtopics are to be identified. Assume, for example, that the terms are account names obtained from charts of accounts provided by many users. If some of the provided charts of accounts include account names that are hierarchically organized, it may be desirable to also include subtopics under the newly identified topics.

In Step 312, the terms grouped under the topic chosen for sub-topic generation are selected for further processing. Subsequently, the method may proceed with the execution of Step 206-210 to obtain the sub-topics and names for the sub-topics.

After completion of the steps shown in FIG. 3, the originally obtained terms are organized under topics (and optionally sub-topics), and names are assigned to these topics (an optionally to the sub-topics), in accordance with one or more embodiments of the disclosure.

In one or more embodiments of the disclosure, the originally obtained terms were entirely or mostly provided by professionals. Accordingly, the resulting topics, sub-topics, topic names and/or sub-topic names may adhere to standards met or expected by professionals, e.g., when executing the method of FIG. 3 as part of Step 202 of FIG. 2.

Further, in one or more embodiments of the disclosure, the originally obtained terms were entirely or mostly provided by non-professionals. Accordingly, the resulting topics, sub-topics, topic names and/or sub-topic names may not adhere to standards met or expected by professionals, e.g., when executing the method of FIG. 3 as part of Step 206 of FIG. 2.

Figure 4:
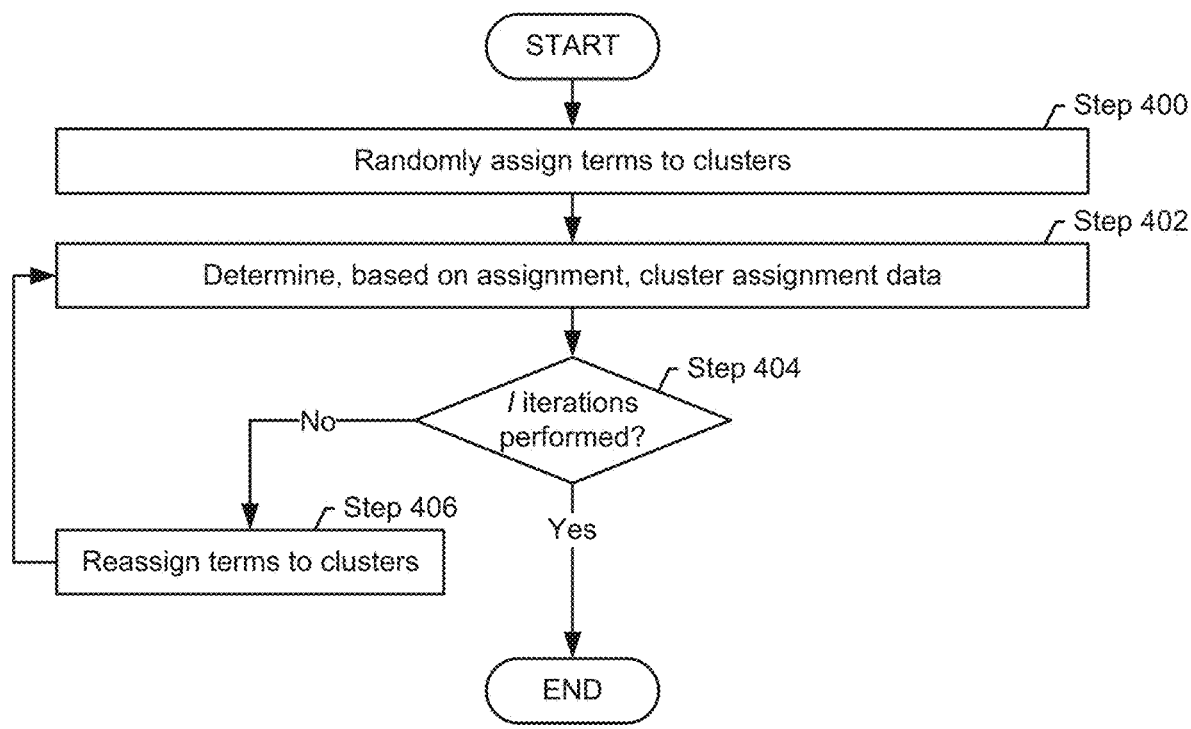

Turning to FIG. 4, a method for identifying topics for terms using tokens and for grouping the terms under these topics is shown. The underlying model, in accordance with an embodiment of the disclosure, is a Dirichlet multinomial mixture model (DMM). The DMM is a probabilistic generative model for documents. As frequently assumed in natural language processing, a document is generated by a mixture model. Here, in embodiments of the disclosure, a document corresponds to a term. Each term, based on the assumed DMM may be generated by combining mixture components (tokens) that are associated with different clusters. Specifically, tokens that belong to different clusters may, in combination, form a term. Depending on the distribution of the clusters contributing to the term, it may be probabilistically decided, to which cluster the term belongs. The subsequently described steps are used to iteratively establish the clusters that, based on the underlying DMM, are necessary to form the terms that were obtained. These clusters are then considered to be the topics under which the terms are organized.

In Step 400, the terms may be randomly assigned to K clusters. K may be selected sufficiently large to accommodate all clusters that may be found in the method described in FIG. 4. In one or more embodiments of the disclosure, a term is only assigned to a single cluster, unlike in a standard latent Dirichlet allocation (LDA).

In Step 402, based on the assignment performed in Step 400, cluster assignment data are determined for the K clusters. The cluster assignment data may include:

$\vec{z}$: cluster labels of each term
$m_z$: number of terms in cluster z
$n_z$: number of tokens in cluster z
$n_z^w$: number of occurrences of token w in cluster z.

In Step 404, a determination is made about whether I iterations of the reassigning terms to clusters have been performed. If I iterations have been performed, the execution of the method may terminate. Under this condition, those k clusters of the K clusters that are not empty (i.e., with terms assigned) are the clusters to be subsequently used as topics in the following steps of FIGS. 2 and 3. If I iterations have not been performed, the method may proceed to Step 406.

In Step 406, a term, d, may be re-assigned to a cluster according to the conditional distribution $p(z_d=z|\vec{z}_{\neg d}, \vec{d})$, where $\neg d$ indicates the cluster label of term d being removed from $\vec{z}$, and where $\vec{d}$ represents the overall available terms. By the subsequent execution of Step 302, each time a cluster z is assigned to a term d (or vice-versa), the corresponding information in $\vec{z}$, $m_z$, $n_z$ and $n_z^w$ are updated accordingly. Step 306, thus introduces Gibbs sampling to obtain or update the assignment of terms to clusters. Here, Gibbs sampling is used for statistical inference to determine a best assignment of terms to clusters. The underlying concept is that observed data (tokens, terms) are incorporated into the sampling process by iteratively making adjustments until the mixture model properly reflects the observed data.

As these iterations of Steps 402-406 are performed, more and more terms with topic similarities are accumulating in the same cluster, based on overlap between the tokens associated with these terms. After a few iterations, e.g., five iterations, the method may have converged such that there is completeness and homogeneity. Completeness, in accordance with an embodiment of the disclosure, refers to the objective of having all terms associated with a particular topic in the same cluster. Homogeneity, in accordance with an embodiment of the disclosure, refers to the objective of having only terms associated with the same topic in the same cluster. As a result of the repeated execution of Steps 402-406, some terms may be reassigned between clusters. Some of the K clusters may no longer contain terms, whereas other clusters may contain an increasing number of terms. The k clusters that contain terms may be returned for further processing, as described in FIG. 3.

Other methods for identifying topics for terms using tokens and for grouping the terms under these topics may be used without departing from the disclosure. For example, a similarity of terms can be calculated from the tokens associated with the terms. This may be performed using methods such as the term frequency, term frequency-inverse document frequency, mutual information and/or other statistics used in natural language processing. Other methods that may be applied include, for example, the word mover's distance algorithm and deep learning to obtain semantic similarity.

Turning to FIG. 5, a method for establishing a mapping between specific first and specific second topics is described. The existence of similarity for any combination of a first and a second topic may be tested. Nested loops may be used to perform a similarity test for these combinations, as illustrated in FIG. 5.

In Step 500, one of the first topics is selected for further processing, and in Step 502, one of the second topics is selected for further processing.

In Step 504, a similarity value is determined for the selected first and second topics. The similarity value may be based on a distance between the terms in the first topic and the terms in the second topic. The closer the terms in the second topic are to the terms in the first topic, the higher the computed similarity value. The distance of the two topics may be obtained in various ways.

(i) Vector space models (e.g., Latent Semantic Indexing algorithm): In a vector space model, each of the topics is represented by a vector. The vector may be based on a body of tokens under consideration. If one of these tokens appears in one (or more) of the terms under the topic, the vector value (weight) for that token is non-zero. A method for determining the weights is the term frequency-inverse document frequency (TF-IDF) algorithm. Other frequencies may be used in lieu of the TF-IDF without departing from the disclosure. Vectors may be obtained for both the first and the second topics. Subsequently, the similarity of these vectors may be assessed to obtain the similarity value. The similarity of the vectors may be determined based on the cosine distance or the Euclidian distance between the vectors.

(ii) Word2Vec, centroids method: A pre-trained word2vec model may be used to obtain vectors for the terms in a topic. The word2vec model may have been pre-trained using a suitable corpus, e.g., domain-specific or domain-related documents. Subsequently, the centroid, representing the topic may be obtained by calculating, for example, the mean vector from the vectors associated with the topic. To obtain a similarity value, the cosine distance between the mean vectors associated with the two topics may be obtained.

(iii) Word2Vec, Word Mover's Distance method: A pre-trained word2vec model may be used to obtain vectors for the terms in a topic. The word2vec model may have been pre-trained using a suitable corpus, e.g., domain-specific or domain-related documents. To obtain a similarity value, the minimal cumulative distance that the terms of the first topic need to travel to reach the words of the second topic is determined.

(iv) Other methods that provide a similarity of the first and the second topics may be used without departing from the disclosure. For example, term frequency, term frequency-inverse document frequency, mutual information and/or other statistics used in natural language processing may be applied. Further, deep learning methods may be used to obtain semantic similarity Step 504 may be performed for the terms under the topics, or alternatively the tokens obtained from the terms (as described in FIG. 3) may be used for the similarity computations. To assess topic similarity, the cumulative similarity of the terms under the topics may be determined, for example, by summing the similarity values obtained for the terms. Consider, for example, two pairs of topics, each with ten terms. The first pair of topics has 8 terms deemed similar, whereas the second pair of topics has only 2 terms deemed similar. Accordingly, the two topics in the first pair are considered similar, whereas the second pair of topics is considered not similar.

In Step 506, a determination is made about whether another second topic is remaining. If so, the method may return to Step 502 to execute for the other second topic. If not other second topic is remaining, the method may proceed to Step 508.

In Step 508, a determination is made about whether another first topic is remaining. If so, the method may return to Step 500 to execute for the other first topic. If not other second topic is remaining, the method may proceed to Step 510.

After completion of Steps 500-508, a similarity value may have been obtained for all possible combinations of first and second topics. These similarity values may be stored in a similarity matrix.

In Step 510, a determination is made about which combinations of first and second topics are sufficiently similar to map them, based on the obtained similarity values. A mapping may be established, for example, if the similarity value for a combination of a particular first and a particular second topic exceeds a set similarity threshold. Alternatively, a set number of mappings may be established based on the highest similarity values. The similarity values used to perform Step 510 may be obtained from the similarity matrix. A mapping may be established between one first topic and one second topic. A mapping may also be established between one first topic and multiple second topics. Similarly, a mapping may also be established between multiple first topics and one second topic.

Figure 6:
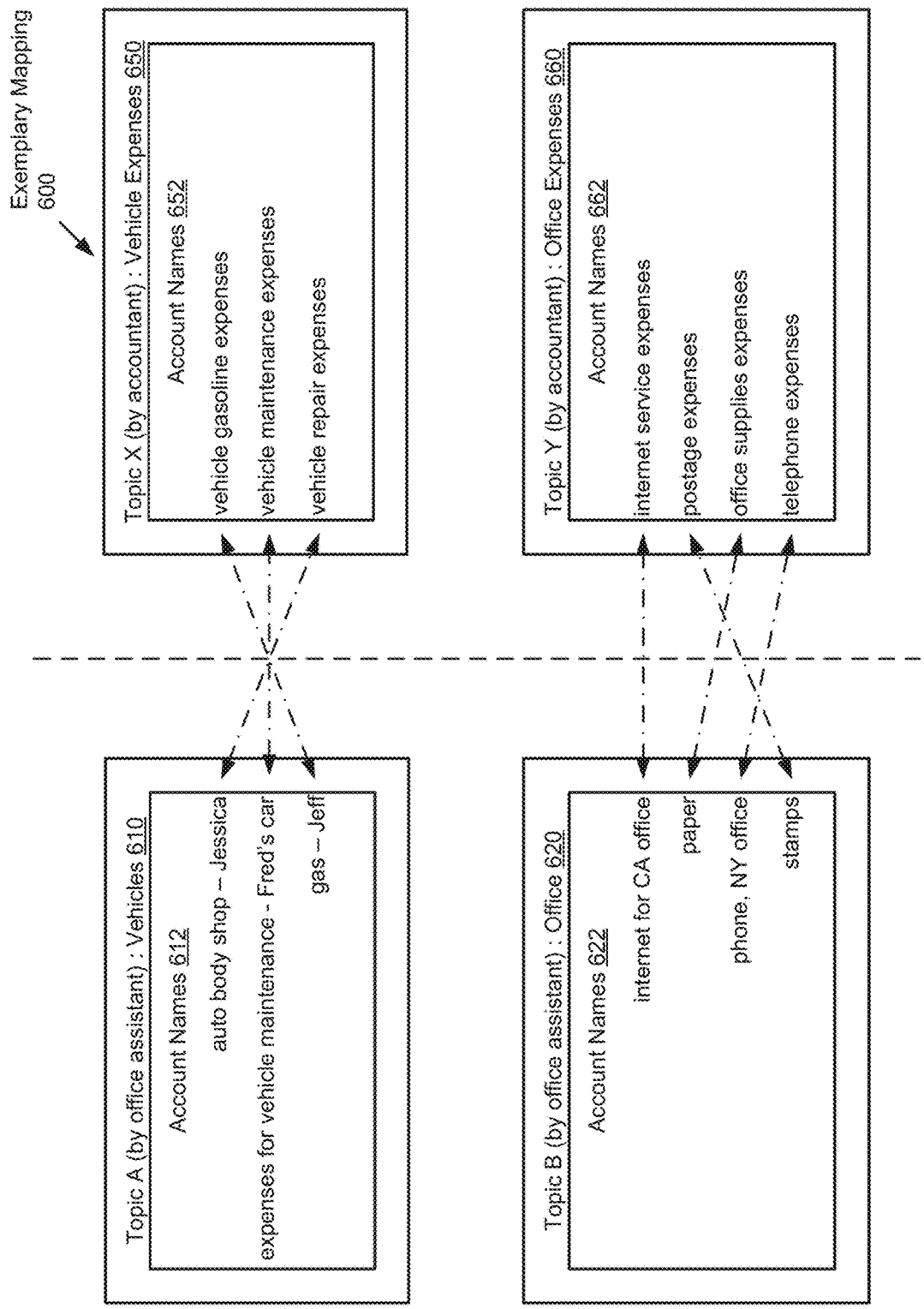
FIG. 6 shows an example in accordance with one or more embodiments of the disclosure.

Turning to FIG. 6, an exemplary mapping (600) between first and second topics, performed in the domain of finance, is shown. A first set of account names (612, 622) was established by an office assistant for the purpose of gaining business insights. Some of these account names are directed toward vehicle expenses, and some of these account names are directed toward office expenses. Accordingly, the account names are grouped under topic A, named "vehicles" (610), and topic B, named "office" (620). A second set of account names (652, 662) was established by an accountant for the purpose of preparing tax forms. The accounts, while directed to the same underlying subject matter, are named differently than the accounts named by the office assistant. The account names are grouped under topic X, named "vehicle expenses" (650) and under topic Y, named "office expenses" (660). Obtaining the topics and topic names may have been performed as previously described in Steps 202 and 206.

In FIG. 6, related account names are identified as indicated by the dash-dotted arrows, when performing Step 208. Each arrow indicates a detected similarity between two account names. As illustrated, all account names under topic A (610) are related to corresponding account names under topic X (650). Similarly, all account names under topic B (620) are related to corresponding account names under topic Y (660). In contrast, none of account names under topic A (610) are related to the account names under topic Y (660), and none of the account names under topic B (620) are related to the account names under topic X (650). Accordingly, a mapping is established between topics A and X and topics B and Y. In the example, the mapping may be beneficial, enabling the direct translation between the account names used by the office assistant and the account names used by the accountant.

While not shown in the example, terms for which no directly corresponding terms are detected may exist. Further, terms for which multiple corresponding terms are detected may also exist. Similarly, it may be determined that one topic maps to multiple other topics, based on the detected term similarity.

Figure 7:
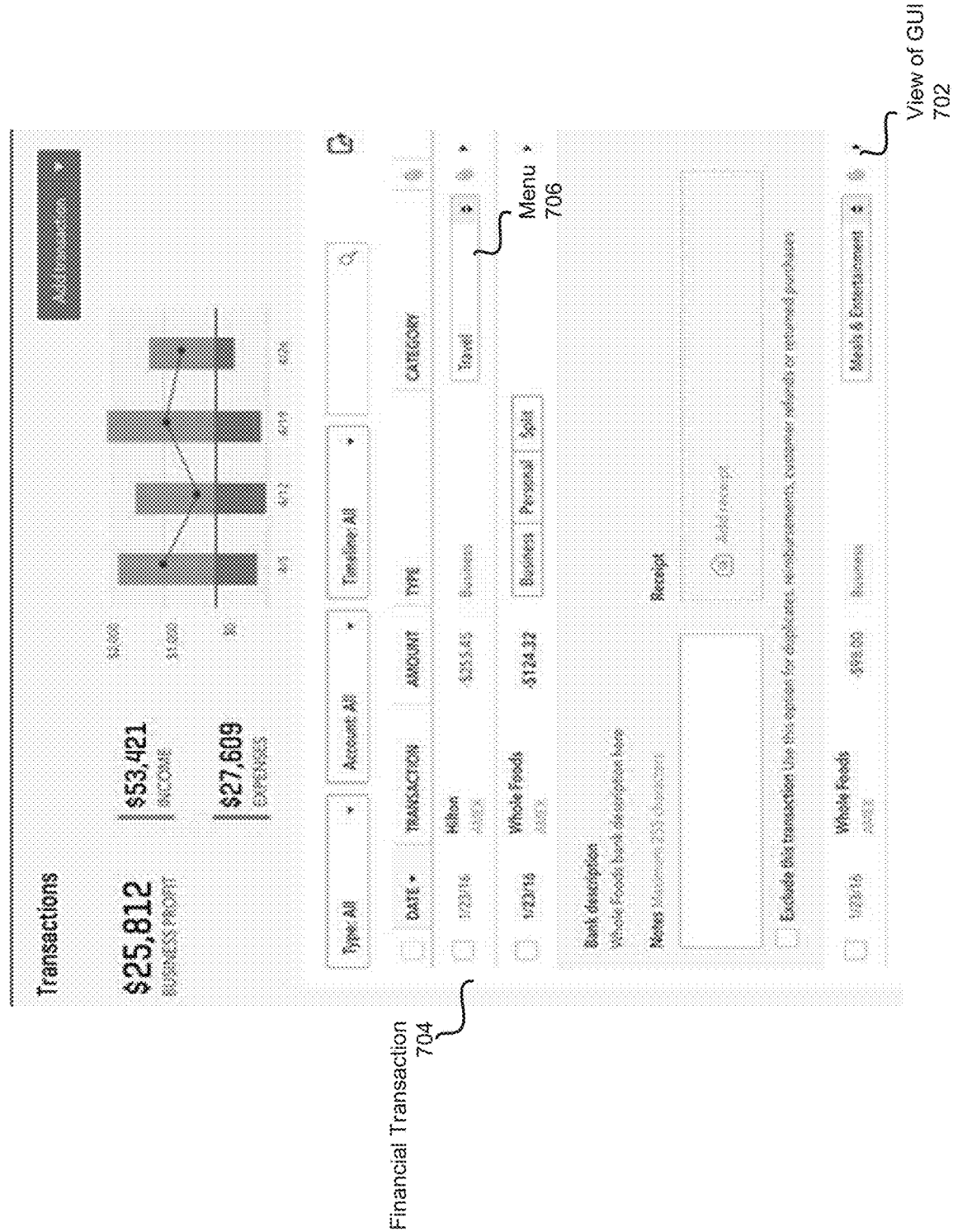
FIG. 7 shows an exemplary user interface in accordance with one or more embodiments of the disclosure.

Turning to FIG. 7, an exemplary graphical user interface (GUI) in accordance with one or more embodiments of the disclosure, is shown. The view (702) in the GUI may be displayed by an accounting application hosted by the application service. The view (702) includes an accounting or financial transaction (704) representing a payment to "Hilton". A menu (706) displays "Travel" as a candidate category for this transaction. In one or more embodiments, the candidate category is a topic name for a topic that was identified using the previously described methods. In the example, the topic name "Travel" is proposed based on a categorization of the transaction "Hilton" as a travel-related expense.

Importantly, as previously discussed, topics or categories may be mapped to other topics or categories, if sufficient similarity is detected. The implication is that in the view (702), categories may be suggested in a manner specific to the user accessing the user interface. Assume (analogous to the example of FIG. 6) that the user accessing the GUI is either an accountant or an office assistant. As previously discussed, accountants and office assistants may use different terminology (account names) for the same underlying subject matter (accounts). Accordingly, based on the mapping, a translation between terminology used by the office assistants and terminology used by the accountants may be performed. If the user is an accountant, the proposed categories may be based on the terms used by accountants, and if the user is an office assistant, the proposed categories may be based on the terms/topics used by the office assistant. For hybrid users, a mix of terms/topics may be provided. Further personalization may be accomplished by weighting the mix of provided terms/topics and/or by incorporating user feedback to adjust the mix of provided terms/topics as desired.

Various embodiments of the present disclosure have one or more of the following advantages. Embodiments of the present disclosure enable the determination of a mapping between topics. As a result of the mapping, an immediate "translation" between mapped topics is possible. The mapping may be determined automatically, without requiring human intervention, and is, therefore, rapid and cost effective. Further, embodiments of the disclosure scale well and are suitable for the processing of millions of terms and topics. Embodiments of the disclosure are applicable to any domain that allows the organization of terms into topics. One or more embodiments of the disclosure leverage the expertise of professionals to obtain topics and topic names, to subsequently assist non-professional users. This subsequent reliance of non-professional users may have downstream benefits. For example, subsequently performed steps may be performed more accurately and/or more reliably due to the use of terms that are in conformity with professional standards. This may be particularly relevant in scenarios where compliance requirements exist, e.g., in accounting. The resulting standardization may further reduce the overall number of terms that users would create and/or use by replacing similar but non-identical terms with a single standard term.

Figure 8A:
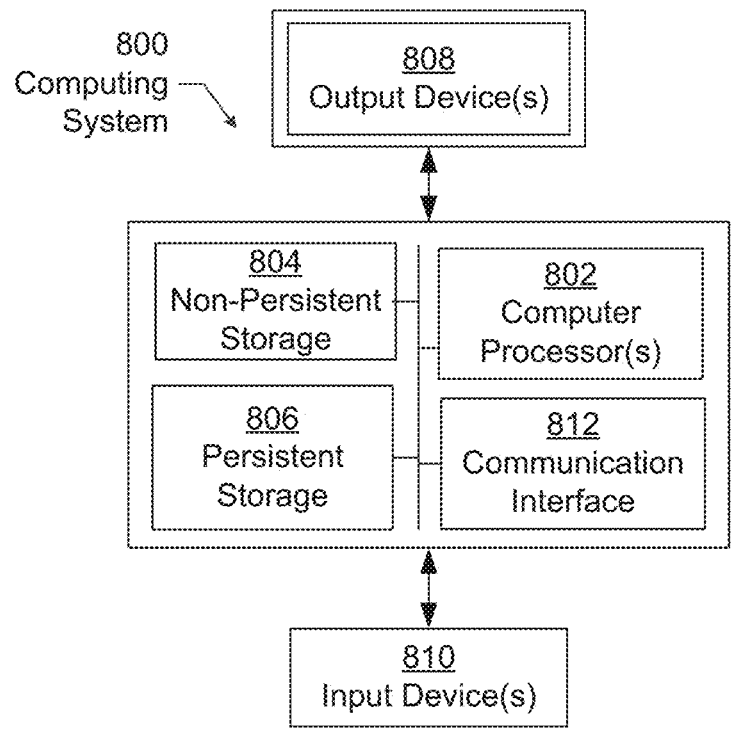
FIGS. 8A and 8B show computing systems in accordance with one or more embodiments of the disclosure.

Embodiments of the present disclosure may be implemented on a computing system. Any combination of mobile, desktop, server, router, switch, embedded device, or other types of hardware may be used. For example, as shown in FIG. 8A, the computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), and numerous other elements and functionalities.

The computer processor(s) (802) may be an integrated circuit for processing instructions. For example, the computer processor(s) may be one or more cores or micro-cores of a processor. The computing system (800) may also include one or more input devices (810), such as a touchscreen, keyboard, mouse, microphone, touchpad, electronic pen, or any other type of input device.

The communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

Further, the computing system (800) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing systems exist, and the aforementioned input and output device(s) may take other forms.

Software instructions in the form of computer readable program code to perform embodiments of the present disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the present disclosure.

Figure 8B:
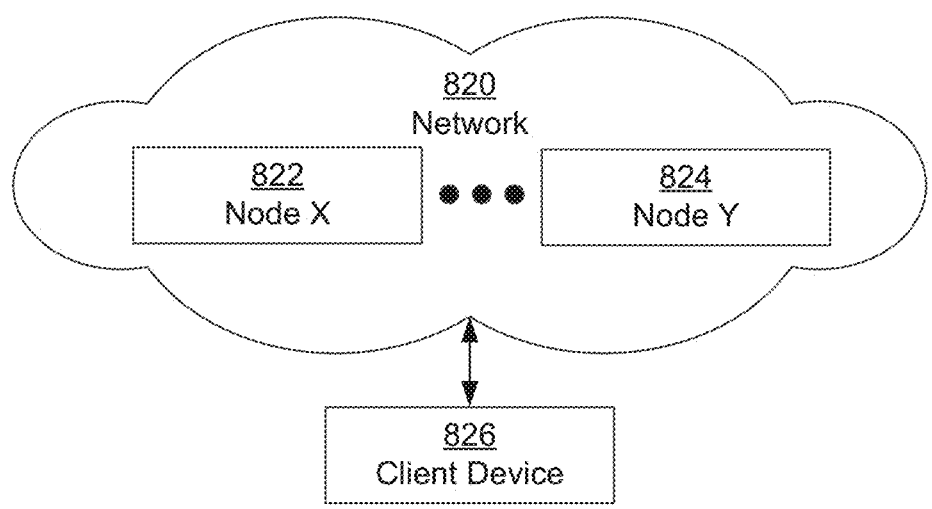

The computing system (800) in FIG. 8A may be connected to or be a part of a network. For example, as shown in FIG. 8B, the network (820) may include multiple nodes (e.g., node X (822), node Y (824)). Each node may correspond to a computing system, such as the computing system shown in FIG. 8A, or a group of nodes combined may correspond to the computing system shown in FIG. 8A. By way of an example, embodiments of the present disclosure may be implemented on a node of a distributed system that is connected to other nodes. By way of another example, embodiments of the present disclosure may be implemented on a distributed computing system having multiple nodes, where each portion of the present disclosure may be located on a different node within the distributed computing system.

Further, one or more elements of the aforementioned computing system (800) may be located at a remote location and connected to the other elements over a network.

Although not shown in FIG. 8B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (822), node Y (824)) in the network (820) may be configured to provide services for a client device (826). For example, the nodes may be part of a cloud computing system. The nodes may include functionality to receive requests from the client device (826) and transmit responses to the client device (826). The client device (826) may be a computing system, such as the computing system shown in FIG. 8A. Further, the client device (826) may include and/or perform all or a portion of one or more embodiments of the present disclosure.

The computing system or group of computing systems described in FIGS. 8A and 8B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the present disclosure. The processes may be part of the same or different application and may execute on the same or different computing system.

Rather than or in addition to sharing data between processes, the computing system performing one or more embodiments of the present disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the present disclosure, may extract one or more data items from the obtained data. For example, the extraction may be performed as follows by the computing system in FIG. 8A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query provided to a structured data repository (where the data repository may be organized according to a database schema or data format, such as XML).

The extracted data may be used for further processing by the computing system. For example, the computing system of FIG. 8A, while performing one or more embodiments of the present disclosure, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the present disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 8A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 8A may include functionality to provide raw and/or processed data, such as results of comparisons and other processing. For example, providing data may be accomplished through various presenting methods. Specifically, data may be provided through a user interface provided by a computing device. The user interface may include a GUI that displays information on a display device, such as a computer monitor or a touchscreen on a handheld computer device. The GUI may include various GUI widgets that organize what data is shown as well as how data is provided to a user. Furthermore, the GUI may provide data directly to the user, e.g., data provided as actual data values through text, or rendered by the computing device into a visual representation of the data, such as through visualizing a data model.

For example, a GUI may first obtain a notification from a software application requesting that a particular data object be provided within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be provided through various audio methods. In particular, data may be rendered into an audio format and provided as sound through one or more speakers operably connected to a computing device.

Data may also be provided to a user through haptic methods. For example, haptic methods may include vibrations or other physical signals generated by the computing system. For example, data may be provided to a user using a vibration generated by a handheld computer device with a predefined duration and intensity of the vibration to communicate the data.

The above description of functions presents only a few examples of functions performed by the computing system of FIG. 8A and the nodes and/or client device in FIG. 8B. Other functions may be performed using one or more embodiments of the present disclosure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   obtaining a plurality of terms that are specific to a domain, wherein:
      a first set of the plurality of terms are obtained from a first user and a second set of the plurality of terms are obtained from a second user,
      the first set of terms do not adhere to a standard of the second user, and
      the second set of terms do adhere to the standard of the second user;
   obtaining tokens from each of the plurality of terms;
   identifying, using a short-text clustering algorithm operating on the tokens, a first plurality of topics within the domain and a second plurality of topics within the domain and different from the first plurality of topics,
      wherein each of the first plurality of topics and the second plurality of topics represents at least one of the plurality of terms,
   assigning each of the plurality of terms to exactly one corresponding topic from among the first plurality of topics and the second plurality of topics, wherein the first set of the plurality of terms is assigned to the first plurality of topics and the second set of the plurality of terms is assigned to the second plurality of topics;
   identifying a first plurality of topic names for the first plurality of topics and a second plurality of topic names for the second plurality of topics, wherein identifying, for each of the first plurality of topic names and the second plurality of topic names, comprises:
      statistically analyzing for relevance ones of the tokens associated with corresponding terms under a corresponding topic,
         wherein relevance is defined as a mathematical estimation that a particular token, from a particular term assigned to a particular topic, is more representative of the particular topic than others of the tokens, and
         selecting the particular token as a selected topic name for a selected one of the first plurality of topics and the second plurality of topics;
   selecting one of the first plurality of topic names and one of the second plurality of topic names to obtain a first selected topic and a second selected topic;
   determining a similarity value between the first selected topic and the second selected topic,
      wherein the similarity value is based on a distance between first terms in the first selected topic and second terms in the second selected topic; and
   establishing, based on the similarity value, a mapping between the first selected topic and the second selected topic.

2. The method of claim 1, further comprising:
   presenting at least one of the first plurality of topic names to a non-professional user without domain expertise.

3. The method of claim 1, further comprising:
   presenting the mapping to a non-professional user without domain expertise.

4. The method of claim 1, further comprising:
   receiving, through a view in a graphical user interface (GUI), categories suggested in a manner specific to the user accessing the GUI.

5. The method of claim 1, further comprising:
   generating a vector space model, wherein each topic in the first plurality of topics and second plurality of topics is represented by a vector.

6. The method of claim 5, wherein the similarity value is determined by a cosine similarity between vectors in the vector space model.

7. The method of claim 1, wherein the similarity value is determined by a TERM FREQUENCY-INVERSE DOCUMENT FREQUENCY (TF-IDF) approach in which each topic in the first plurality of topics is treated as a term and each sub-topic in a subset of topics is treated as a document.

8. The method of claim 1, wherein the short-text clustering algorithm is based on a Dirichlet multinomial mixture model.

9. The method of claim 1, wherein identifying the first plurality of topics and the second plurality of topics comprises:
   randomly assigning the plurality of terms to K clusters;
   determining cluster assignment data, based on the random assignment;
   repeatedly reassigning the plurality of terms to clusters selected from the K clusters using Gibbs sampling; and
   obtaining the first plurality of topics and the second plurality of topics as subsets of the K clusters that comprise the plurality of terms.

10. A system, comprising:
    a hardware processor and memory; and
    software instructions stored in the memory, which when executed by the hardware processor, cause the hardware processor to:
       obtain a plurality of terms that are specific to a domain, wherein:
          a first set of the plurality of terms are obtained from a first user and a second set of the plurality of terms are obtained from a second user,
          the first set of terms do not adhere to a standard of the second user, and
          the second set of terms do adhere to the standard of the second user;
       obtain tokens from each of the plurality of terms;
       identify, using a short-text clustering algorithm operating on the tokens, a first plurality of topics within the domain and a second plurality of topics within the domain and different from the first plurality of topics,
          wherein each of the first plurality of topics and the second plurality of topics represents at least one of the plurality of terms,
       assign each of the plurality of terms to exactly one corresponding topic from among the first plurality of topics and the second plurality of topics, wherein the first set of the plurality of terms is assigned to the first plurality of topics and the second set of the plurality of terms is assigned to the second plurality of topics;
       identifying a first plurality of topic names for the first plurality of topics and a second plurality of topic names for the second plurality of topics, wherein identifying, for each of the first plurality of topic names and the second plurality of topic names, comprises:
          statistically analyzing for relevance ones of the tokens associated with corresponding terms under a corresponding topic,
             wherein relevance is defined as a mathematical estimation that a particular token, from a particular term assigned to a particular topic, is more representative of the particular topic than others of the tokens, and selecting the particular token as a selected topic name for a selected one of the first plurality of topics and the second plurality of topics;

selecting one of the first plurality of topic names and one of the second plurality of topic names to obtain a first selected topic and a second selected topic;

determining a similarity value between the first selected topic and the second selected topic, wherein the similarity value is based on a distance between first terms in the first selected topic and second terms in the second selected topic; and establishing, based on the similarity value, a mapping between the first selected topic and the second selected topic.

11. The system of claim 10, further comprising:
a graphical user interface (GUI),
wherein the software instructions further cause the hardware processor to present, using the GUI, at least one of the first plurality of topic names to a non-professional user without domain expertise.

12. The system of claim 10, further comprising:
a graphical user interface (GUI), wherein the software instructions further cause the hardware processor to present, using the GUI, the mapping to a non-professional user without domain expertise.

13. The system of claim 10, further comprising:
a graphical user interface (GUI), wherein the software instructions further cause the hardware processor to receive, through a view of the GUI, categories suggested in a manner specific to the user accessing the GUI.

14. The system of claim 10, wherein the software instructions further cause the hardware processor to generate a vector space model, wherein each topic in the first plurality of topics and second plurality of topics is represented by a vector.

15. The system of claim 14, wherein the similarity value is determined by a cosine similarity between vectors in the vector space model.

16. A non-transitory computer readable medium comprising computer readable program code for causing a computer system to:
obtain a plurality of terms that are specific to a domain, wherein:
a first set of the plurality of terms are obtained from a first user and a second set of the plurality of terms are obtained from a second user,
the first set of terms do not adhere to a standard of the second user, and
the second set of terms do adhere to the standard of the second user;
obtain tokens from each of the plurality of terms;
identify, using a short-text clustering algorithm operating on the tokens, a first plurality of topics within the domain and a second plurality of topics within the domain and different from the first plurality of topics, wherein each of the first plurality of topics and the second plurality of topics represents at least one of the plurality of terms, assign each of the plurality of terms to exactly one corresponding topic from among the first plurality of topics and the second plurality of topics, wherein the first set of the plurality of terms is assigned to the first plurality of topics and the second set of the plurality of terms is assigned to the second plurality of topics;

identify a first plurality of topic names for the first plurality of topics and a second plurality of topic names for the second plurality of topics, wherein the computer readable program code for identifying, for each of the first plurality of topic names and the second plurality of topic names, comprises:

computer readable program code for statistically analyzing for relevance ones of the tokens associated with corresponding terms under a corresponding topic, wherein relevance is defined as a mathematical estimation that a particular token, from a particular term assigned to a particular topic, is more representative of the particular topic than others of the tokens, and computer readable program code for selecting the particular token as a selected topic name for a selected one of the first plurality of topics and the second plurality of topics;

select one of the first plurality of topic names and one of the second plurality of topic names to obtain a first selected topic and a second selected topic;

determine a similarity value between the first selected topic and the second selected topic, wherein the similarity value is based on a distance between first terms in the first selected topic and second terms in the second selected topic; and establish, based on the similarity value, a mapping between the first selected topic and the second selected topic.

17. The non-transitory computer readable medium of claim 16, wherein the computer readable program code further causes the computer system to present, using a graphical user interface (GUI), at least one of the first plurality of topic names to a non-professional user without domain expertise.

18. The non-transitory computer readable medium of claim 16, wherein the computer readable program code further causes the computer system to receive, through a view of the graphical user interface (GUI), categories suggested in a manner specific to the user accessing the GUI.

19. The non-transitory computer readable medium of claim 16, wherein the computer readable program code further causes the computer system to generate a vector space model, wherein each topic in the first plurality of topics and the second plurality of topics is represented by a vector.

20. The non-transitory computer readable medium of claim 19, wherein the similarity value is determined by a cosine similarity between vectors in the vector space model.

* * * * *

UNITED STATES PATENT AND TRADEMARK OFFICE
CERTIFICATE OF CORRECTION

PATENT NO. : 10,824,661 B1
APPLICATION NO. : 15/967593
DATED : November 3, 2020
INVENTOR(S) : Bei Huang et al.

It is certified that error appears in the above-identified patent and that said Letters Patent is hereby corrected as shown below:

In the Claims

Claim 10, Column 22, at the beginning of Line 57, the word "identifying" should read -- identify --.

Claim 10, Column 23, at the beginning of Line 7, the word "selecting" should read -- select --.

Claim 10, Column 23, at the beginning of Line 10, the word "determining" should read -- determine --.

Claim 10, Column 23, at the beginning of Line 15, the word "establishing" should read -- establish --.

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*